(12) United States Patent
Tangudu et al.

(10) Patent No.: US 11,431,208 B2
(45) Date of Patent: Aug. 30, 2022

(54) ELECTRIC COMPONENT INCLUDING CUSTOM METAL GRAIN ORIENTATION

(71) Applicant: Hamilton Sundstrand Corporation, Charlotte, NC (US)

(72) Inventors: Jagadeesh Tangudu, South Windsor, CT (US); Beata I. Wawrzyniak, South Windsor, CT (US); John A. Sharon, West Hartford, CT (US); James T. Beals, West Hartford, CT (US); Tahany Ibrahim El-Wardany, Bloomfield, CT (US); Wayde R. Schmidt, Pomfret Center, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 207 days.

(21) Appl. No.: 16/820,438

(22) Filed: Mar. 16, 2020

(65) Prior Publication Data
US 2020/0220394 A1     Jul. 9, 2020

Related U.S. Application Data

(62) Division of application No. 15/349,643, filed on Nov. 11, 2016, now Pat. No. 10,594,172.

(60) Provisional application No. 62/254,364, filed on Nov. 12, 2015.

(51) Int. Cl.
| | |
|---|---|
| *H02K 1/02* | (2006.01) |
| *H01F 27/25* | (2006.01) |
| *H01F 41/02* | (2006.01) |
| *C22C 38/02* | (2006.01) |
| *C21D 9/00* | (2006.01) |
| *C21D 8/12* | (2006.01) |
| *H02K 1/16* | (2006.01) |
| *H02K 1/276* | (2022.01) |

(52) U.S. Cl.
CPC ............... *H02K 1/02* (2013.01); *C21D 8/12* (2013.01); *C21D 9/0068* (2013.01); *C22C 38/02* (2013.01); *H01F 27/25* (2013.01); *H01F 41/0213* (2013.01); *H02K 1/16* (2013.01); *H02K 1/2766* (2013.01)

(58) Field of Classification Search
CPC ....... H01F 41/0213; H01F 27/25; H02K 1/02; H02K 1/16; H02K 1/2766; C22C 38/02; C21D 8/12; C21D 9/0068
USPC ........................................... 310/254.1
See application file for complete search history.

(56) References Cited

U.S. PATENT DOCUMENTS

| | | |
|---|---|---|
| 5,212,419 A | 5/1993 | Fisher et al. |
| 5,543,674 A | 8/1996 | Koehler |
| 5,628,861 A | 5/1997 | Segal |
| 6,066,904 A | 5/2000 | Fei et al. |
| 6,960,860 B1 | 11/2005 | Decristofaro et al. |
| 7,057,324 B2 * | 6/2006 | Breznak ............ H02K 1/02 310/216.006 |
| 8,760,028 B2 | 6/2014 | Nakahara et al. |

(Continued)

*Primary Examiner* — Rashad H Johnson
(74) *Attorney, Agent, or Firm* — Cantor Colburn LLP (57) ABSTRACT

An electrical device includes an electromagnetic component configured to generate a magnetic flux. The electromagnetic component includes a soft magnetically-conductive material configured to pass magnetic flux therethrough along a flux path. The soft magnetically-conductive material includes at least one grain oriented portion having metal grains that are oriented parallel with respect to the magnetic flux.

6 Claims, 6 Drawing Sheets

(56) References Cited

U.S. PATENT DOCUMENTS

| | | |
|---|---|---|
| 2002/0175586 A1 | 11/2002 | Hill |
| 2004/0245879 A1* | 12/2004 | Hirzel .................... H02K 1/02 |
| | | 310/156.01 |
| 2012/0312432 A1* | 12/2012 | Fukutomi ............... C22C 38/02 |
| | | 148/559 |
| 2014/0035423 A1 | 2/2014 | Veronesi et al. |
| 2014/0191624 A1 | 7/2014 | Jahshan |
| 2015/0061453 A1 | 3/2015 | Taniguchi |
| 2015/0076951 A1 | 3/2015 | Lynch et al. |
| 2015/0118407 A1 | 4/2015 | Hosek et al. |
| 2015/0244214 A1 | 8/2015 | Kreidler |
| 2016/0133364 A1* | 5/2016 | Degner ................... H01F 1/22 |
| | | 335/297 |
| 2017/0141625 A1 | 5/2017 | Tangudu et al. |
| 2017/0294811 A1 | 10/2017 | Hosek et al. |
| 2019/0148994 A1* | 5/2019 | Rong ...................... H01F 1/22 |
| | | 335/297 |

\* cited by examiner

ELECTRIC COMPONENT INCLUDING CUSTOM METAL GRAIN ORIENTATION

CROSS-REFERENCE TO RELATED APPLICATIONS

This application is a divisional of U.S. application Ser. No. 15/349,643, filed on Nov. 11, 2016, which claims the benefit of U.S. Provisional Application No. 62/254,364, filed on Nov. 12, 2015, both applications being incorporated herein by reference in their entirety.

STATEMENT OF FEDERAL SUPPORT

This invention was made with government support under DE-AR0000308 awarded by the U.S. Department of Energy. The government has certain rights in the invention.

TECHNICAL FIELD

Various non-limiting embodiments are generally related to electric components, and more particularly, to electromagnetic metal grain components.

BACKGROUND

Electromagnetic devices and machines such as electrical motors, transformers, etc., typically include a soft magnetically-conductive material to promote magnetic flux that is generated during operation of the device. Various types of soft magnetically-conductive material such as electric steel, for example, can be fabricated to include metal grains. In terms of electrical motors, for example, the flux generated during operation has a varying angle of incidence with respect to the metal grains formed in the soft magnetically-conductive material (e.g., the stator).

Figure 1A:
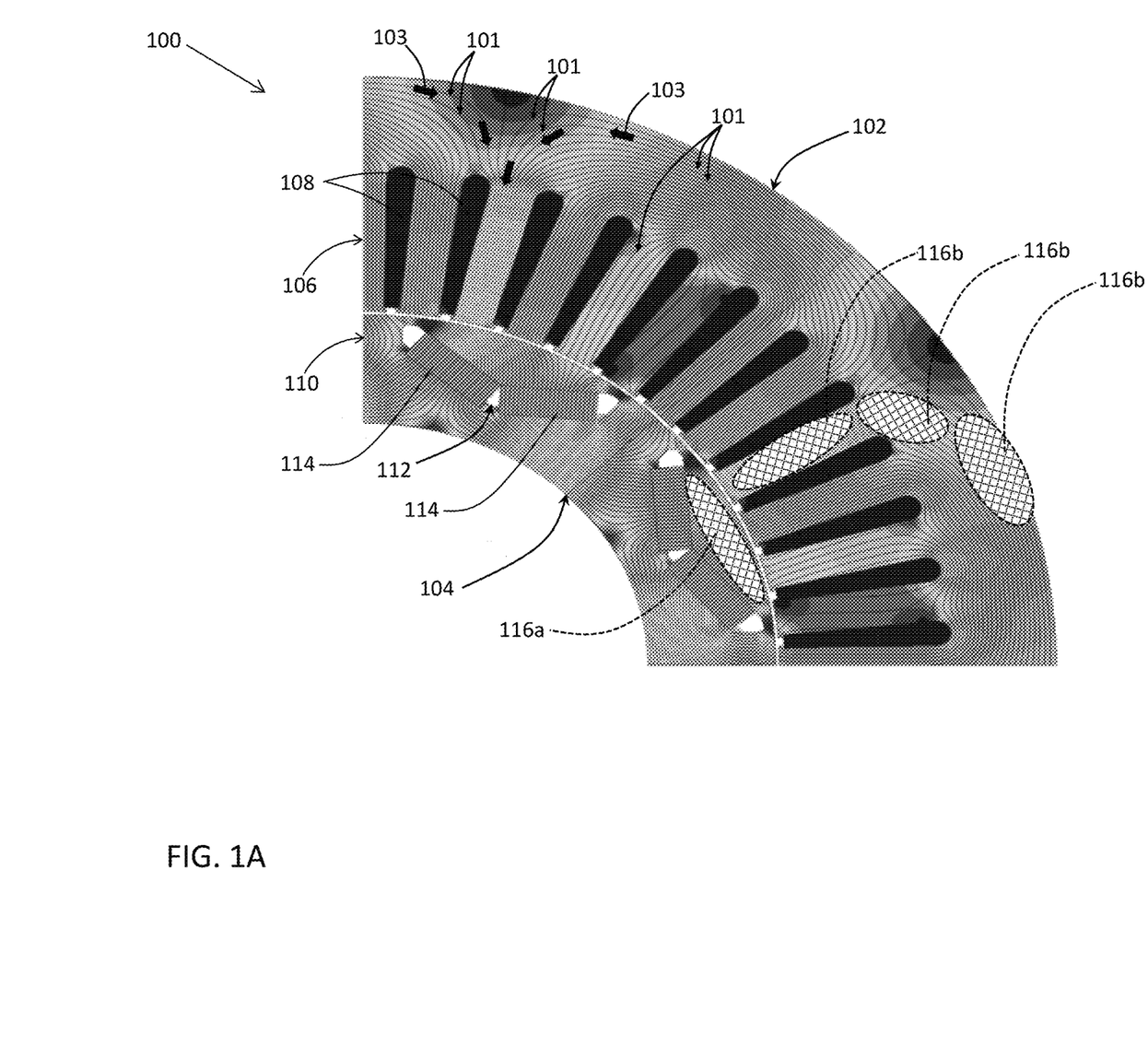
FIG. 1A is a sectional view of a motor showing a flux distribution at a first time.
Figure 1B:
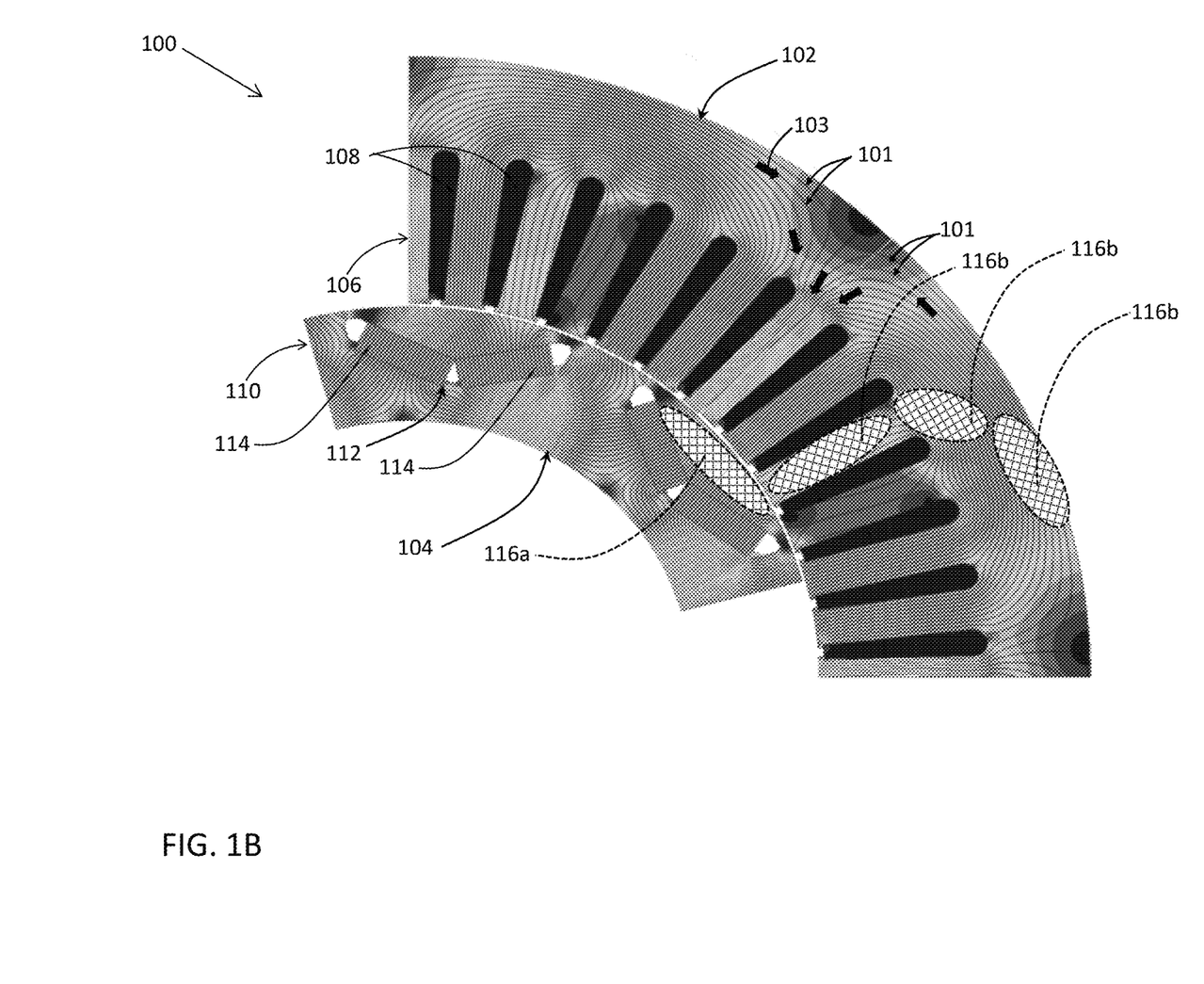
FIG. 1B is a sectional view of a motor showing the flux distribution at a second time.

Referring to FIG. 1A, for example, a distribution of flux generated during operation of a permanent magnet (PM) motor 100 at a first time (T1) is illustrated. The PM motor 100 includes a stator 102 and a rotor 104. The stator 102 includes an outer ring 106 with twelve slots 108 (e.g., forty-eight slots 108 would be shown in a full view). The rotor 104 includes an inner ring 110 with poles 112. Each pole 112 is formed from a pair of rectangular magnets 114 (e.g., eight poles 112 would be shown in a full view). Turning to FIG. 1B, the flux distribution generated by the PM motor 100 at a subsequent time (T2) is illustrated. The flux paths 101 illustrated in FIGS. 1A-1B indicate the orientation (indicated by arrows 103) of the flux.

As shown in FIG. 1B, it is difficult to match the rolling (i.e., rotational) direction of the soft magnetically-conductive material, e.g., steel, 1 with the flux (i.e., flux paths 101) at a particular moment in time. Therefore, the soft magnetically-conductive material of the stator 102 and/or rotor 104 included in conventional motors 100 is typically fabricated having non-grain orientated metal 116a-116b. That is, the rotor metal grains 116a and the stator metal grains 116b formed in the soft magnetically-conductive material of conventional motors 100 have an orientation that is irrespective of the flux paths 101. As a result, the metal grains 116a-116b (i.e., the grains and their boundaries) that are not aligned (i.e., are not parallel) with the flux paths 101 at a particular moment in time act as flux obstacles that reduce efficiency and performance of the electromagnetic device because the non-alignment generates more reluctance for the flux to flow thereby contributing to increase losses.

SUMMARY

According to a non-limiting embodiment, an electrical device includes an electromagnetic component configured to generate a magnetic flux. The electromagnetic component includes a soft magnetically-conductive material configured to pass magnetic flux therethrough along a flux path. The soft magnetically-conductive material includes at least one grain oriented portion having metal grains that are oriented parallel with respect to the magnetic flux.

According to another non-limiting embodiment, a method of fabricating an electric device comprises determining flux paths of a soft magnetically-conductive material of the electric device, and determining expected amplitudes of the flux paths and comparing the expected amplitudes to an amplitude threshold. The method further comprises selectively forming grain oriented metal portions in the soft magnetically-conductive material. The method further includes forming the grain oriented metal portions at low amplitude locations where the expected flux amplitude is at or below the amplitude threshold.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various non-limiting embodiments provide an electromagnetic device that includes a soft magnetically-conductive material having a controlled metal grain orientation. The grain-orientation of the soft magnetically-conductive material is controlled such that metal grains are oriented at strategic locations so as to match the direction of the flux path. In this manner, the performance and efficiency of the electromagnetic device is optimized. In at least one embodiment, the grain orientation grain orientation refers to the morphology/shape and/or the crystallography of the grain.

Various embodiments employ additive manufacturing techniques combined with additional post-processing processes to fabricate soft magnetically-conductive material components such as electric steel stators, rotors, and transformer straps, for example, with control over the morphology of the grains and/or crystallographic texture on the level of an individual laminate. At least one embodiment includes a rotating machine having a rotor that rotates with respect to a stationary electric steel stator. The electric steel stator is fabricated with a controlled grain orientation. In at least one embodiment, the grain orientation refers to the morphology/shape and/or the crystallography of the grain. The controlled metal grains extend radially along the teeth as well as circumferentially on the outer edge, sometimes referred to as a back iron or yoke, where the flux path is nearly constant. At transition regions where the flux direction is changing, non-grain oriented electric steel may be employed. Thus, at least one embodiment includes one or more zones or locations with specifically oriented metal grains.

In at least one embodiment, the laminate can be also manufactured with radially grain oriented teeth and a non-grain oriented transition section for better cost effectiveness. As previously mentioned, achieving this differentiation may be accomplished through additive techniques and post processing. The specific additive methods to be targeted include processes that employ an energy source, either laser or electron beam, to selectively melt the steel alloy powder. The process parameters of the additive system such as the tool speed, energy source power, powder flow rate, etc. can be adjusted to control grain size, shape and location. As for crystallographic texture, this can be developed through either seeding off of a substrate with the desired crystal texture or by post build thermo-mechanical methodologies. This latter concept essentially supports the rolling and heat treatment approach used to control grain orientation at one or more strategic locations. For instance, the morphology/shape of the grain and/or the crystallography of the grain can be controlled at one or more strategic locations of the soft magnetically-conductive material.

In at least one embodiment, the electrical component is fabricated as a transformer including grain oriented metal portions formed in one or more corner regions. The linear path of flux may be achieved by sub-sectioning the core to enforce the desired flux path. In this manner, regions of the straps falling outside the grain-oriented metal zone may be removed from the transformer, thereby reducing overall weight and improving efficiency.

Figure 2:
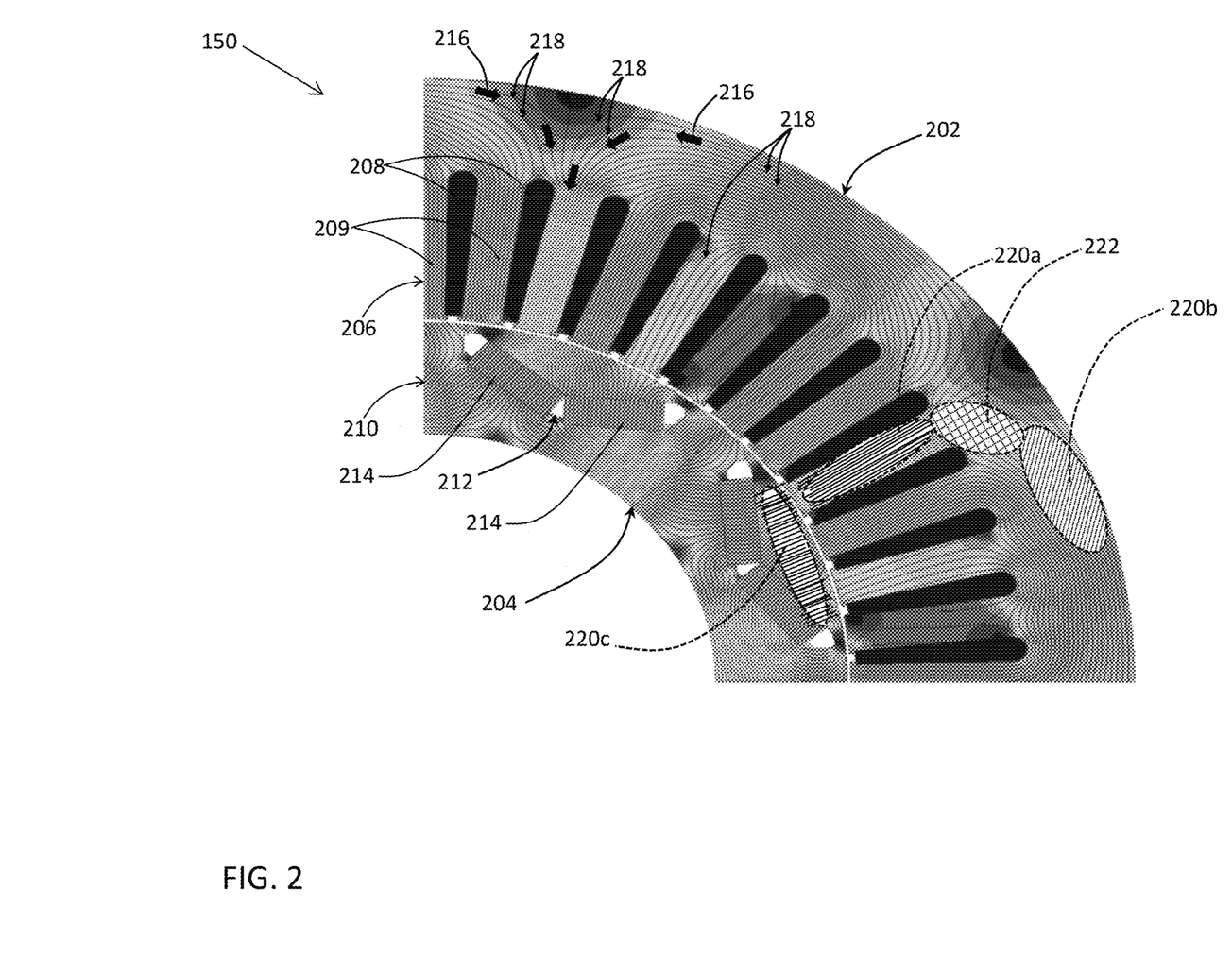
FIG. 2 illustrates an electrical device including an electric component having a custom metal grain orientation according to a non-limiting embodiment.

Turning now to FIG. 2, an electrical device 150 including an electric component having a custom metal grain orientation is illustrated according to a non-limiting embodiment. Unlike conventional electric devices that provide non-grain oriented metal components, the custom metal grain orientation provided by at least one embodiment of the invention matches the distribution of flux so as to improve the performance and efficiency of the electrical device. As illustrated in FIG. 2, the electrical device 150 according to at least one non-limiting embodiment includes a permanent magnet (PM) motor 200. It should be appreciated, however, that the electrical device 150 may include other types of motors including, but not limited to, induction motors, switch reluctance motors, etc., or other types of electromagnetic devices such as, for example, transformers.

The PM motor 200 includes a stator 202 and a rotor 204. The stator 202 includes an outer ring 206 with twelve slots 208 (e.g., forty-eight slots 208 would be shown in a full view). The slots 208 define a plurality of stator teeth 209 extending radially between an inner circumference of the stator 202 located adjacent the rotor 204 and an opposing outer circumference of the stator 202. The rotor 204 includes an inner ring 210 with poles 212. Each pole 212 is formed from a pair of rectangular magnets 214 (e.g., eight poles 212 would be shown in a full view). The stator 202 and/or the rotor 204 are formed from a soft magnetically-conductive material. In at least one embodiment, the soft magnetically-conductive material is electric steel comprising a combination of iron (Fe) and silicon (Si). In at least one embodiment, the steel may comprise about 6.5 weight percentage (wt. %) of silicon. During operation the, PM motor rotor 200 generates flux. The flux orientation 216 changes as the rotor rotates and create flux that travels along various flux paths 218.

Unlike conventional PM motors which include a rotor and/or stator completely formed of non-grain oriented metal (see FIGS. 1A-1B), the PM motor 200 according to least one non-limiting embodiment includes a stator 202 and/or rotor 204 having customized grain oriented metal formed at one or more strategic locations. In this manner, flux throughput is increased so as to improve the overall performance of the PM motor 200.

In at least one embodiment, the stator 202 includes one or more grain oriented metal portions 220a-220b and one or more non-grain oriented portions 222. The grain oriented metal portions 220a-220b are strategically formed at locations respective to the orientation 216 of the flux paths 218. Control over the morphology of the grains and crystallographic texture on the level of an individual laminate may be achieved using various rolling and heat treatment techniques that develop elongated grains along the rolling direction as well as crystallographic texture aligned with the rolling direction.

For example, strategic locations of grain oriented and non-grain oriented portions may be controlled using additive techniques and post processing. Various additive methods to be targeted include processes that employ an energy source, either laser or electron beam, to selectively melt the steel alloy powder. Various process parameters of the additive system such as the tool speed, energy source power, powder flow rate, etc. can be adjusted to control grain size and morphology or shape. Crystallographic texture can also be controlled through either seeding off of a substrate with the desired crystal texture or by post build thermo-mechanical methodologies. This latter concept essentially supports the rolling and heat treatment approach according to the grain orientation, i.e. a grain orientation process.

According to a non-limiting embodiment, a first grain oriented metal portion 220a is formed along the radial direction of one or more of the stator teeth 209. In this area, the flux paths 218 extend radially and substantially parallel to the radial direction of a respective stator tooth 209. Accordingly, the metal grains are formed having a radial orientation that matches the radial direction of the flux paths 218 corresponding to the respective stator tooth 209. That is, the grain of the first metal grain portion 220a is parallel or substantially parallel to the radial direction of the respective stator tooth 209, and thus the radial direction of the corresponding flux path 218.

As further illustrated in the non-limiting embodiment of FIG. 2, a second grain orientated metal portion 220b is formed along the outer circumference of the stator 202, sometimes referred to as the outer section of the stator yoke. In this area of the stator 202, the flux paths 218 are predominately circumferential, and at times may travel perpendicularly with respect to the flux paths 218 in the stator teeth 209. In areas where a significant deviation from the circumferential orientation occurs, the amplitude of the flux is relatively small. For instance, a flux threshold can be determined and amplitudes falling at or below the flux threshold may be identified as relatively small amplitudes.

These relatively small amplitudes include amplitudes of flux (much) below the magnetic saturation level specific to the particular soft-magnetic material. At magnetic saturation level in the areas with significant deviation losses can be prohibitive to use oriented steel. Therefore, the orientation of the metal grain formed at the second grain oriented metal portion 220b is formed parallel with the direction of the flux flowing through the outer section of the stator yoke. That is, the metal grain of the second grain orientated metal portion 220b is formed substantially circumferential so as to match the circumferential orientation of the flux paths 218 at the outer circumference of the stator 202.

In some areas of the stator 202, however, the flux paths 218 have various directional paths or vectors. For instance, the flux paths 218 existing where the stator teeth 209 meet the outer circumference or stator yoke have various non-consistent orientations. Some flux paths 218 may travel in a radial direction while other flux paths 218 may travel in a circumferential direction. As a result, the amplitude of the flux is relatively high compared to the flux amplitudes at the stator teeth 209 and/or exterior circumference. For instance, amplitudes exceeding the flux threshold may be considered a relatively high amplitude. These relatively high amplitudes include amplitudes that exist at or above the magnetic saturation level specific for soft-magnetic material. Accordingly, the non-grain oriented portions 222 can be formed at these high-flux areas as further illustrated in FIG. 2.

In at least one embodiment, the rotor 204 may also include one or more grain oriented metal portions 220c. As illustrated in FIG. 2, the flux paths 218 located between the poles 212 and the inner circumference of the rotor 204 are substantially aligned with the radial paths dictated by the stator teeth 209. Accordingly, a third oriented metal portion 220c may be formed between the poles 212 and the inner circumference of the rotor 204, where the grains are orientated in substantially radial orientation, or an orientation that is substantially parallel with the flux paths 218 corresponding to the magnets 214 of a respective pole 212.

Figure 3:
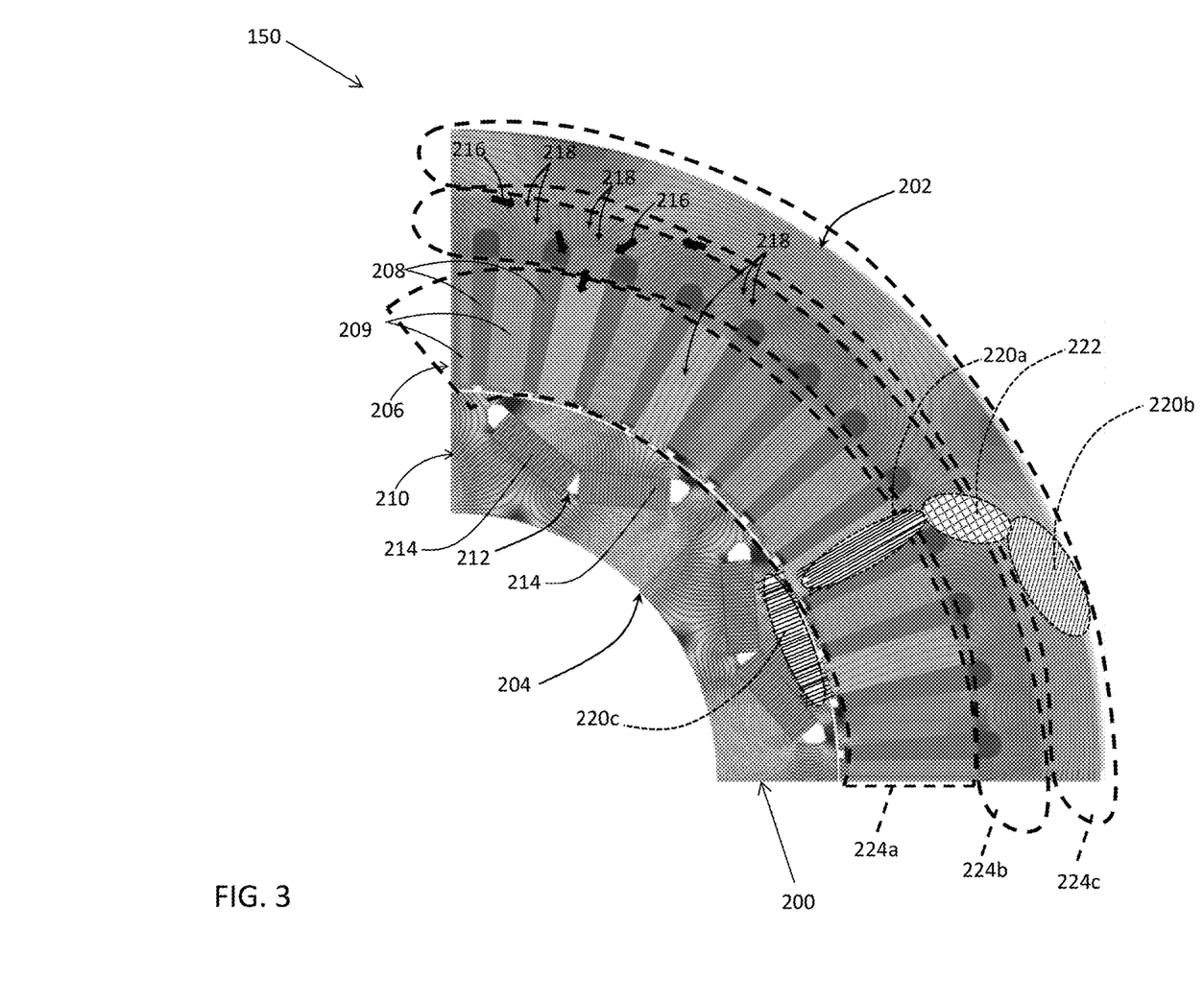
FIG. 3 illustrates the electrical device of FIG. 2 showing various metal grain zones of the stator.

Although specific locations of grain oriented metal portions 220a-220c and non-grain oriented metal portions 222 are described above, the invention is not limited thereto. Referring to FIG. 3, for example, the stator 202 may be sectioned into one or more metal grain zones 224a-224c. Each metal grain zone 224a-224c may be formed entirely of a particular grain orientation or non-grain orientation. For instance, a first metal grain zone 224a including a majority portion of the stator teeth 209 may be formed having a radial metal orientation that matches the radial direction of the flux paths 218 flowing through the stator teeth 209. A second metal grain zone 224b including a minor portion of the stator teeth 209 and a minor portion of the outer stator circumference may be formed having a non-grain metal orientation since the flux paths 218 in this area vary and are inconsistent. A third metal grain zone 224c including the majority of the outer stator circumference may be formed having a circumferential metal orientation that matches the circumferential direction of the flux paths 218 flowing through the outer circumference of the stator 202.

Figure 4A:
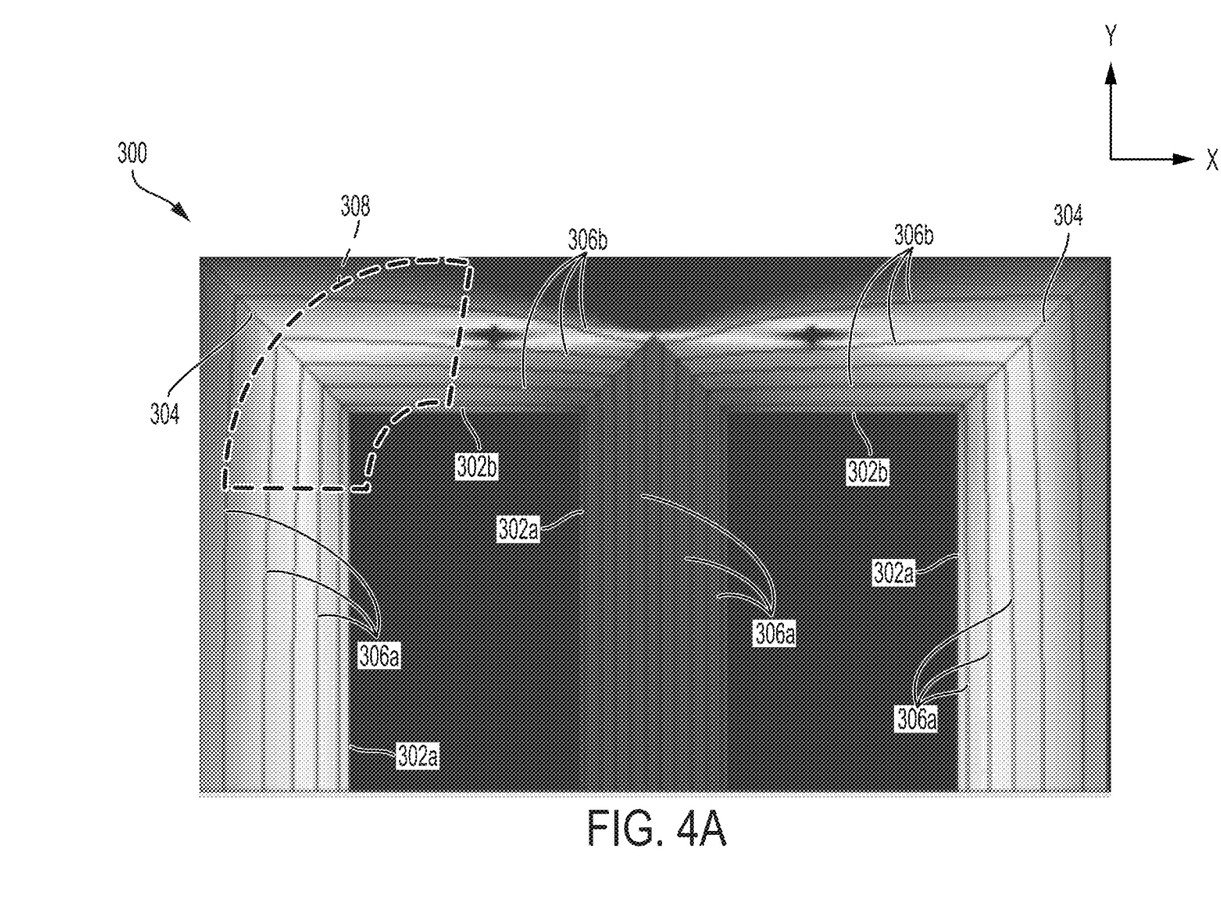
FIG. 4A illustrates a half cross-section of an electrical transformer device including grain oriented soft magnetically-conductive sheets.

Turning to FIG. 4A, an electrical device 300 including an electric component having a metal grain orientation is illustrated. The electrical device 300 includes a transformer with core built from grain oriented laminations. The ability to control the grain orientation in the transformer 300 improves performance relative to one containing only non-oriented grains.

Still referring to FIG. 4A, a half section of the transformer 300 is shown. The transformer 300 includes a plurality of vertical straps 302a and a plurality of horizontal straps 302b. The vertical straps 302a extend along a vertical axis (e.g., Y-axis) to define a vertical length. The horizontal strap 302b extends along a horizontal axis (e.g., X-axis) to define a horizontal length. The horizontal strap 302b can include a single strap with a center portion cut out to accommodate the center vertical strap, or can include two individual straps such that each end of the vertical straps 302a is coupled to the horizontal strap 302b. The points at which the center vertical straps 302a are coupled to the horizontal strap 302b define a beveled edge 304. The beveled edges 304 between adjacent straps (e.g., an end of vertical strap 302a and an end of the horizontal strap 302b) prevent field concentration at the corners. In this manner, losses at the corners of the transformer 300 are reduced. In at least one embodiment, the transformer 300 includes a center vertical strap 302a interposed between a pair of outer vertical straps 302a. In this case, the transformer 300 includes a horizontal strap 302b with a cutout in the center that is coupled to the center vertical strap 302a.

Flux paths 306a-306b are shown travelling in directions corresponding to the lengths of the straps 302a-302b. For instance, vertical flux paths 306a extend vertically along the length (i.e., Y-axis) of the vertical straps 302a. Horizontal flux paths 306b extend horizontally along the length (i.e., X-axis) of the horizontal strap 302b.

Figure 4B:
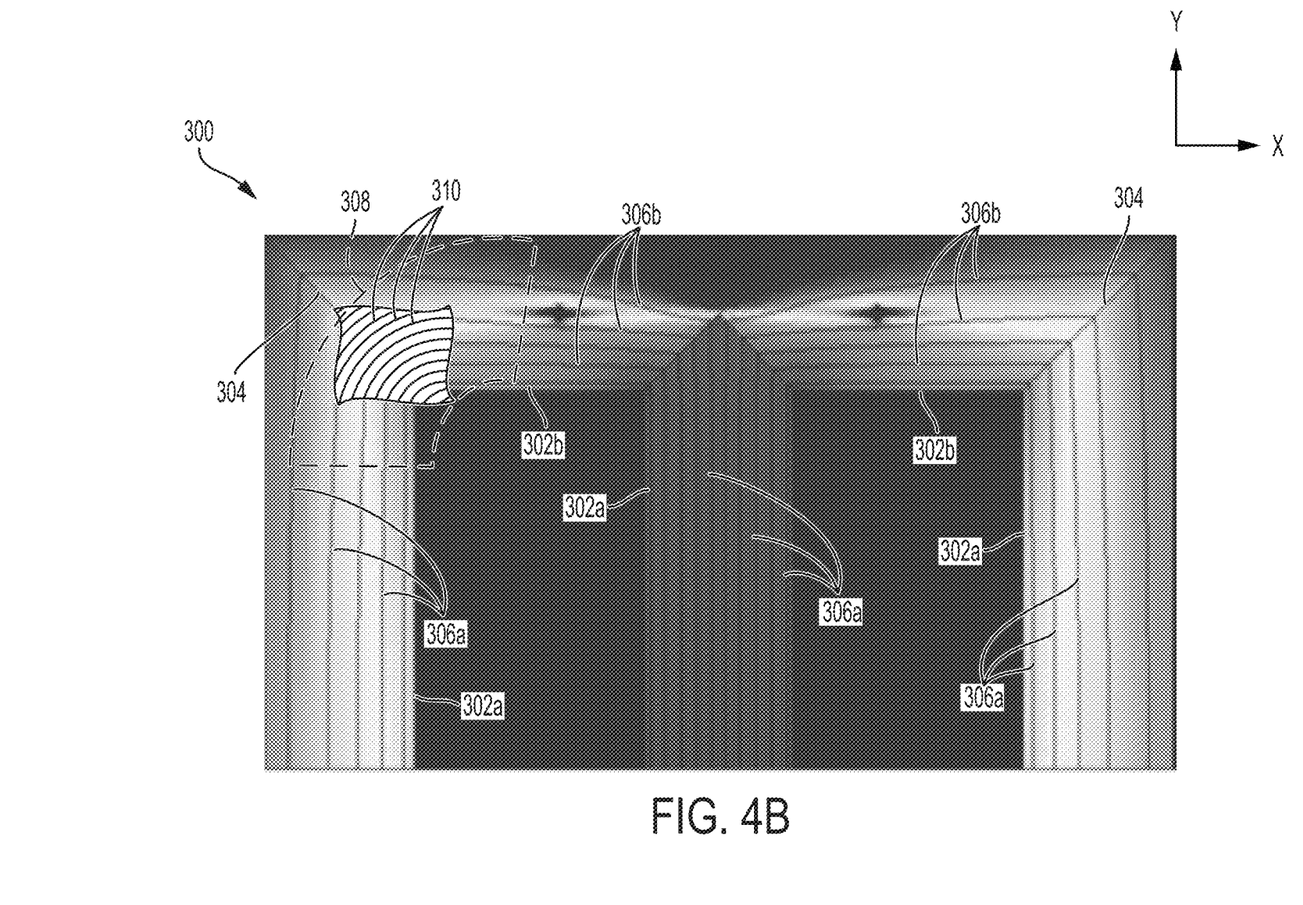
FIG. 4B illustrates an electrical transformer device including a cutaway portion showing a custom metal grain orientation according to another non-limiting embodiment.

Unlike conventional transformers, at least one embodiment provides a transformer 300 including a custom grain orientation formed in the arched corner zone 308. The frame of the transformer 300 may have various cross-sectional shapes including but not limited to, rectangular-shaped frame. The custom grain orientation includes arched metal grains 310 as illustrated by the cutaway portion shown in FIG. 4B. In this manner, a direct connection between the vertical section and adjacent horizontal section of the core is achieved without adversely affecting the field concentration. Further, regions of the straps 302a-302b located outside the grain oriented metal zone 308 may be removed from the transformer 300, thereby reducing overall weight. In at least one embodiment, the first end of the center vertical strap 302a includes a non-grain orientation metal portion (not shown in FIG. 4B).

As described above, various embodiments may provide an electric device including a soft magnetically-conductive material having customized grain oriented portions. The electrical devices include, but are not limited to, transformers, electrical machines, rotors inductors, sensors, actuators, Eddy current devices, etc. The grain oriented portions are strategically located with respect to the orientation of flux paths so as to reduce flux resistance, thereby improving the performance and efficiency of the device. In terms of rotating machines such as PM motors, for example, an electric steel stator and/or rotor may be formed with grain oriented metal portions aligned radially along the radial direction of the stator teeth as well as circumferentially along the outer circumference of the stator where the orientation of the flux paths are substantially constant and consistent. In transition regions where the orientation of the flux paths vary and are inconsistent, non-grain oriented metal portions may be formed.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of fabricating an electric device, the method comprising:

determining flux paths of a soft magnetically-conductive material of the electric device;

determining expected amplitudes of the flux paths and comparing the expected amplitudes to an amplitude threshold; and selectively forming grain oriented metal portions in the soft magnetically-conductive material, the grain oriented metal portions formed at low amplitude locations where the expected flux amplitude is at or below the amplitude threshold.

2. The method of claim 1, wherein forming the grain oriented metal portions includes forming metal grains having an orientation that is parallel to the flux paths at the low amplitude locations.

3. The method of claim 2, wherein the grain oriented metal portions are formed in at least one of a stator and a rotor of an electrical motor.

4. The method of claim 2, wherein the grain oriented metal portions are formed in at least one of a vertical strap and a horizontal strap of an electrical transformer.

5. The method of claim 3, wherein the grain oriented metal portions of the stator are formed in stator teeth and an outer yoke portion.

6. The method of claim 5, further comprising forming at least one rotor grain oriented metal portion in the rotor and between magnets coupled to the rotor and the stator teeth, wherein an orientation of the at least one rotor grain oriented metal portion is substantially parallel with magnet flux paths of the magnets and the flux paths of the stator teeth.

* * * * *